United States Patent [19]
Sakurai

[11] Patent Number: 6,033,127
[45] Date of Patent: Mar. 7, 2000

[54] CAMERA

[75] Inventor: Motoharu Sakurai, Narashino, Japan

[73] Assignee: Seiko Precision Inc., Japan

[21] Appl. No.: 09/074,362

[22] Filed: May 7, 1998

[30] Foreign Application Priority Data

May 8, 1997 [JP] Japan .................................... 9-117346
May 13, 1997 [JP] Japan .................................... 9-121828

[51] Int. Cl.[7] .................................................. G03B 17/24
[52] U.S. Cl. ......................................... 396/413; 396/536
[58] Field of Search .................................... 396/411, 413, 396/284, 536, 538

[56] References Cited

U.S. PATENT DOCUMENTS

5,778,269  7/1998  Williams ................................ 396/411

*Primary Examiner*—David M. Gray
*Attorney, Agent, or Firm*—Adams & Wilks

[57] ABSTRACT

A camera comprises an operating member mounted for rotation in first and second opposite directions by manual operation for winding and rewinding a film, respectively. A rotational winding member is mounted for connection to and disconnection from the operating member. A control member is mounted for movement between first and second positions for controlling the rotating direction of the operating member. When the control member is disposed in the first position, the operating member can be rotated only in the first direction and the rotational winding member is connected to the operating member for rotation therewith to wind the film. When the control member is disposed in the second position, the operating member can be rotated only in the second direction to rewind the film while the rotational winding member is disconnected from and does not rotate with the operating member.

24 Claims, 8 Drawing Sheets

CAMERA

BACKGROUND OF THE INVENTION

Field of the Invention

The present invention relates to a camera and, more particularly, to a camera which is economical to manufacture and in which a film is manually wound and rewound and a used state of the film is displayed in a film cartridge, i.e., an advanced photo system (hereafter referred to as APS) film is used.

Background Information

Hithertofore, there has been available an economical camera which is sometimes referred to as a so-called "film with a lens", in which a film is manually wound (e.g., does not automatically wind the film using a motor) and which does not have an automatic focusing system. This type of camera is generally known as a throwaway or disposable camera and has a function of rewinding a previously wound film one frame at a time by means of a rewinding knob in order to simplify the winding mechanism. Furthermore, in the case of a manual camera in which a film can be replaced, a winding knob and a rewinding knob have been independently provided. In a camera in which APS film can be used and replaced, operations such as winding and rewinding of the film and switching of a display showing the used state of the film in a cartridge have been performed by a motor powered by means of a battery.

Conventional cameras in which the film is wound and rewound by a motor generally have an aesthetic external appearance since it is not necessary to provide a winding knob and a rewinding knob on an outer frame of the camera. Furthermore, in conventional disposable cameras, since it is not necessary to replace the film, it suffices if only the rewinding knob is provided. However, in conventional cameras in which the film can be replaced and operations such as winding of the film are performed manually, a winding knob and a rewinding knob have been independently provided, so that the external appearance of the camera has not been aesthetic. Furthermore, although conventional disposable cameras have a simple structure, wasteful consumption has been promoted with respect to this type of camera since parts which may be still be used are discarded.

Moreover, in conventional cameras in which APS film is used and then the camera is discarded, it has not been necessary to switch a display of the used state of the film. In conventional cameras in which the APS film can be replaced, however, since operations such as winding and rewinding of the film and a switching of a display of the used state of the film in a cartridge are performed by a motor, electrical parts are required, so that reduction in the manufacturing cost of the camera has been limited.

SUMMARY OF THE INVENTION

In order to provide a camera which has the economical attributes of disposable cameras, which can display the used state of an APS film, and which has an aesthetic external appearance, the camera of the present invention has one knob which is used for winding and rewinding the film by a rotating direction regulating member. According to the present invention, after the rewinding operation becomes an operating state of the camera, an exposure of the film can not be performed unless that operating state is released when removing a film cartridge. Furthermore, when a locking operation of a cover member of the camera after loading the film and a lock releasing operation of the cover member when removing the film are performed manually, a display of a used or exposed state of the film in the film cartridge is switched in accordance with these operations.

The invention provides a camera which uses a film cartridge having a mark for indicating a used state of the film housed therein and which has a mechanism for manually winding and rewinding the film. The mechanism comprises a winding knob, a rotating direction regulating member and a regulating member drive portion for driving the rotating direction regulating member. When the rotating direction regulating member is disposed at a first position, the winding knob can be rotated only in a first direction, and the rotation of the winding knob is transmitted to a winding shaft, thereby winding the film. When the rotating direction regulating member is disposed at a second position by the regulating member drive portion, the winding knob can be rotated only in a reverse direction or a second direction opposite to the first direction, and the rotation of the winding knob in the reverse direction is not transmitted to the winding shaft, so that a rewinding of the film is performed by the rotation of the winding knob in the reverse direction.

The camera according to the present invention further comprises an operating lever for locking a cover member of a housing portion of the film cartridge, and a mechanism disposed between the regulating member drive portion and the operating lever for maintaining an operating state of the regulating member drive portion. In order to place the regulating member drive portion in a non-operating state, the mechanism for maintaining the operating state of the regulating member drive portion is released by pivotal movement of the operating lever.

The camera according to the present invention further comprises a rotating gear for rotating a film shaft disposed in the film cartridge, a drive gear for opening and closing a shading cover in the film cartridge, and a wheel train having a clutch mechanism for transmitting a pivoting motion of the operating lever to the rotating gear and the drive gear. During removal of the film cartridge from the camera, the clutch mechanism is engaged by pivoting the operating lever in a first direction, thereby rotating the rotating gear so that a predetermined used state of the film is displayed by the mark in the film cartridge and rotating the drive gear so as to close the shading cover. During loading of the film cartridge into the camera, the clutch mechanism is disengaged by pivoting the operating lever in a reverse direction or a second direction opposite the first direction, thereby making the rotating gear non-rotatable and rotating the drive gear in the reverse direction so as to open the shading cover.

DETAILED DESCRIPTION OF THE PREFERRED EMBODIMENT

A preferred embodiment of the present invention will now be described with reference to the accompanying drawings.

Certain terminology is used in the following description for convenience only and is not intended to be limiting. The words right, left, front, rear, upper, lower, inner, outer, rearwardly and forwardly designate directions in the drawing to which reference is made. Such terminology includes the words above specifically mentioned and words of similar import.

FIGS. 1–16 show an embodiment of the structure of the camera according to the present invention where a camera case 1 has a center plate 1a for supporting the following structure of the camera described below. A film cartridge C is inserted into a film cartridge chamber or film cartridge housing portion 1b (FIG. 10) disposed within the case 1 by opening a cover member 1c (FIG. 12) disposed at a lower side of the case 1. A film F is drawn from a slit 14d (FIG. 13) formed on a side surface of the film cartridge C, and a photographing operation is performed one frame at a time. An operating member comprising a winding knob 2 is rotatably disposed at the right side of the camera in FIG. 1, and a tooth portion 2a disposed on an outer periphery of the winding knob 2 projects slightly from an upper portion of a rear surface of the case 1 (FIG. 12) so that a user can operate it manually. A rotating winding member in the form of a winding shaft 3 is disposed at the left side in FIG. 1. Rotation of the winding knob 2 is transmitted to the winding shaft 3 through a driving mechanism comprising a transmitting wheel train W1 shown in FIG. 3. A gear 3a is mounted at an end portion of the winding shaft 3 in coaxial relation therewith.

Figure 1:
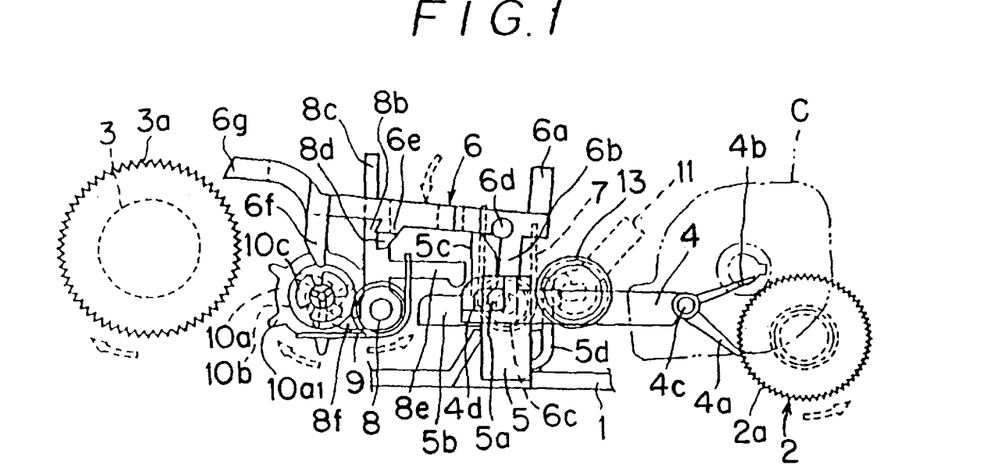
FIG. 1 is a plan view showing a main portion of an embodiment of a camera according to the present invention.
Figure 2:
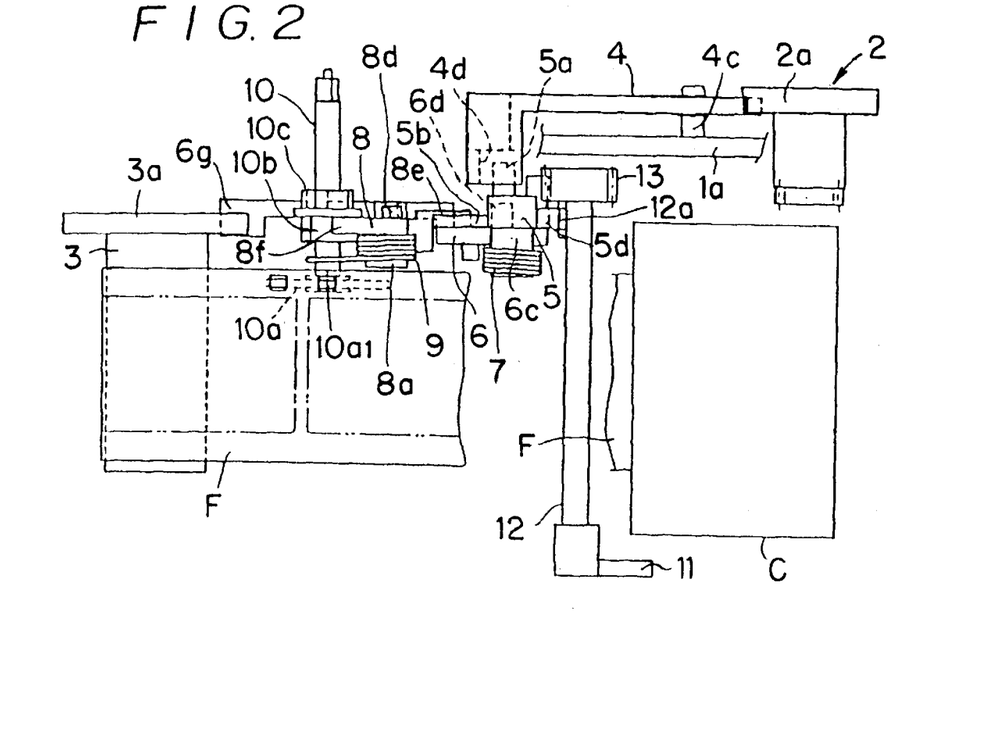
FIG. 2 is a front view of FIG. 1.

One of a pair of reverse rotation preventing pawls 4a and 4b connected to a first end portion of a control member comprising a reverse rotation preventing lever 4, which defines a rotating direction regulating member, engages with the tooth portion 2a of the winding knob 2. The reverse rotation preventing lever 4 is pivotally supported by a pin 4c disposed on the center plate 1a in perpendicular relation thereto. A connecting groove portion 4d is provided at a second end portion of the reverse rotation preventing lever 4 opposite the first end portion.

A rewinding button 5 defines a drive member or regulating member drive portion for driving the reverse rotation preventing lever 4. An end portion (refer to a lower end portion in FIG. 1) of the rewinding button 5 is exposed from the case 1 and can be operated by a user. A connecting pin 5a projects beyond an upper surface of the rewinding button 5 and is fitted into the connecting groove portion 4d of the reverse rotation preventing lever 4, thereby transmitting the motion or displacement of the rewinding button 5 to the reverse rotation preventing lever 4. As shown in FIG. 1, an arm 5b, an arm 5c and an elastically engaging arm 5d extend from the rewinding button 5 in a leftward direction, in an upper direction and in a rightward direction, respectively.

A release lever 6 is disposed at an upper position of the rewinding button 5 as shown in FIG. 1. The release lever 6 is adapted such that a pressing motion of a release button (not shown) is transmitted to a front end of an arm 6a extending upwardly from a right end portion in FIG. 1. The release lever 6 is supported for pivotal movement by a shaft 6c provided on a front end lower surface of an arm 6b extending in perpendicular relation thereto. A biasing member or spring 7 is wound around the shaft 6c, and a counterclockwise urging force is applied to the release lever 6 by the spring 7.

Referring again to FIGS. 1 and 2, a pin 6d is disposed on an upper surface of the release lever 6 in the vicinity of a base portion of the arm 6b for engagement with a tapered end surface disposed on a front end of the arm 5c of the rewinding button 5. A pawl-like projecting portion 6e extends downwardly from an intermediate portion of the release lever 6. A projecting piece 6f projects downwardly on a left side of the projecting portion 6e. An engaging pawl 6g is disposed on a left end portion of the release lever 6 for engagement with the gear 3a of the winding shaft 3.

A shutter lever 8 is disposed on a left side of the rewinding button 5. The shutter lever 8 is supported for pivotal movement by a shaft 8a extending generally perpendicular from a lower surface thereof. A spring 9 is wound around the shaft 8a and applies a biasing force to the shutter lever 8 in a clockwise direction as shown in FIG. 1. A front end portion of an arm 8b extends to an upper portion of the shutter lever 8 and defines a shutter drive portion 8c. An engaging projection 8d projects upwardly from an upper surface of the shutter lever 8 at an intermediate portion of the arm 8b and is engageable with the projecting portion 6e of the release lever 6. An arm 8e of the shutter lever 8 extends in the rightward direction in FIG. 1 and has a front end for engagement with the arm 5b of the rewinding button 5. An arm 8f extends in a leftward direction in FIG. 1 from a base portion of the shutter lever 8.

A shaft 10 is rotatably supported at a left portion of the shutter lever 8, and a sprocket wheel 10a having sprocket teeth 10a1 for engaging with perforations of a film F is connected to a lower end portion of the shaft 10. A cam 10b is provided at an intermediate portion of the shaft 10. In this embodiment, the cam 10b has three cam surfaces disposed at equal intervals and curving smoothly toward an outer periphery thereof. The arm 8f of the shutter lever 8 is engageable with each of the cam surfaces of the cam 10b. Another cam 10c is provided on the cam 10b and has three fan-like cam surfaces positioned around the shaft 10 at predetermined gaps. A front end of the projecting piece 6f of the release lever 6 can be elastically contacted with the fan-like cam surfaces 10c and the gaps between the fan-like cam surfaces 10c.

An operating lever 11 for locking the cover member 1c of the film cartridge housing portion 1b is provided on a bottom surface of the camera case 1 and projects outwardly therefrom. A shaft 12 is integrally connected to the operating lever 11, defining a pivoting center for the operating lever 11, and extends toward an upper surface of the case 1. A gear 13 is fixed to a projecting end of the shaft 12. The gear 13 is provided so as to display that the used state mark of the film is a state in which a photographing operation has already been performed when removing the film cartridge C from the camera, and to drive a wheel train W2 for closing a shading cover of the film F by pivoting the operating lever 11. The driving operation of the wheel train W2 will be described later in detail with reference to FIGS. 9–10.

A mechanism for maintaining the operating state of the rewinding button 5 is disposed between the shaft 12 and the rewinding button 5. The operating state of the rewinding button 5 means a state in which the rewinding button 5 is pressed and a rewinding motion of the film F is performed. Further, the non-operating state of the rewinding button 5 means a state in which the rewinding button is not pressed and a winding operation of the film is performed. The mechanism for maintaining the operating state of the rewinding button 5 comprises an engaging portion 12a disposed on an upper end portion of the shaft 12 for engagement with a front end of the elastically engaging arm 5d of the rewinding button 5 to maintain the rewinding button 5 in a pressed state.

Figure 3:
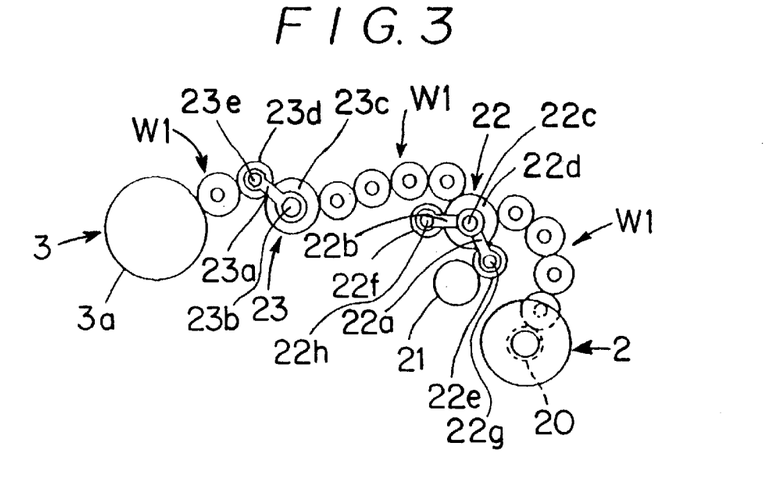
FIG. 3 is a reduced plan view showing a wheel train for winding and rewinding a film.

An embodiment of the wheel train W1 for winding the film F is shown in FIG. 3. The wheel train W1 extends from a gear 20 of the winding knob 2 to the gear 3a of the rewinding shaft 3. The wheel train W1 comprises a gear 21 for rotating a film shaft 24 of the film cartridge C (FIG. 14), switching means 22 for switching the rotating direction of the gear 21 between a normal direction and a reverse direction, and clutch means 23 for interrupting the transmission of the rotation to the gear 3a of the rewinding shaft 3.

The switching means 22 comprises two arms 22a, 22b supported for pivotal movement on a center shaft 22c of a center gear 22d, and pinions 22e, 22f rotatably supported by shafts 22g, 22h at a front end of each of the arms 22a, 22b, respectively. The pinions 22e, 22f are always meshed with the center gear 22d, and the pinion to be meshed with the gear 21 is switched in accordance with the rotating direction of the center gear 22d. In FIG. 3, when the gear 20 rotates in a counterclockwise direction (when winding the film), the center gear 22d rotates clockwise and the pinion 22e rotates counterclockwise and is meshed with the gear 21 so that a clockwise rotation is transmitted to the gear 21. In contrast, when the gear 20 is rotated clockwise (when rewinding the film), the center gear 22d rotates counterclockwise and the pinion 22f is meshed with the gear 21 and rotated clockwise, so that a counterclockwise rotation is transmitted to the gear 21.

The clutch means 23 comprises an arm 23a supported for pivotal movement on a center shaft 23b of a center gear 23c, and a pinion 23d rotatably supported by a shaft 23e at a front end of the arm 23a. The pinion 23d is always meshed with the center gear 23c, and rotation of the pinion 23d is transmitted to the gear 3a of the winding shaft 3 through another gear in the wheel train, thereby rotating the winding shaft 3 clockwise when winding the film. During rewinding of the film, since the center gear 23c of the clutch means 23 rotates clockwise, the pinion 23d moves in a rightward direction and is separated from the next gear, thereby not transmitting rotation to the gear 3a so that the rewinding shaft 3 is in a freewheel state.

Figure 9:
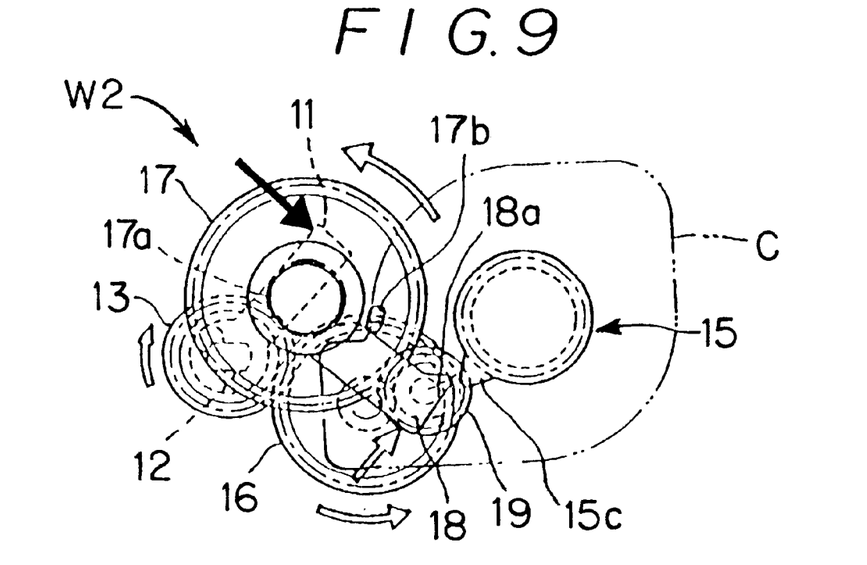
FIG. 9 is a plan view of a mechanism for closing a shading cover and a mechanism for displaying a used state mark in accordance with the invention.
Figure 10:
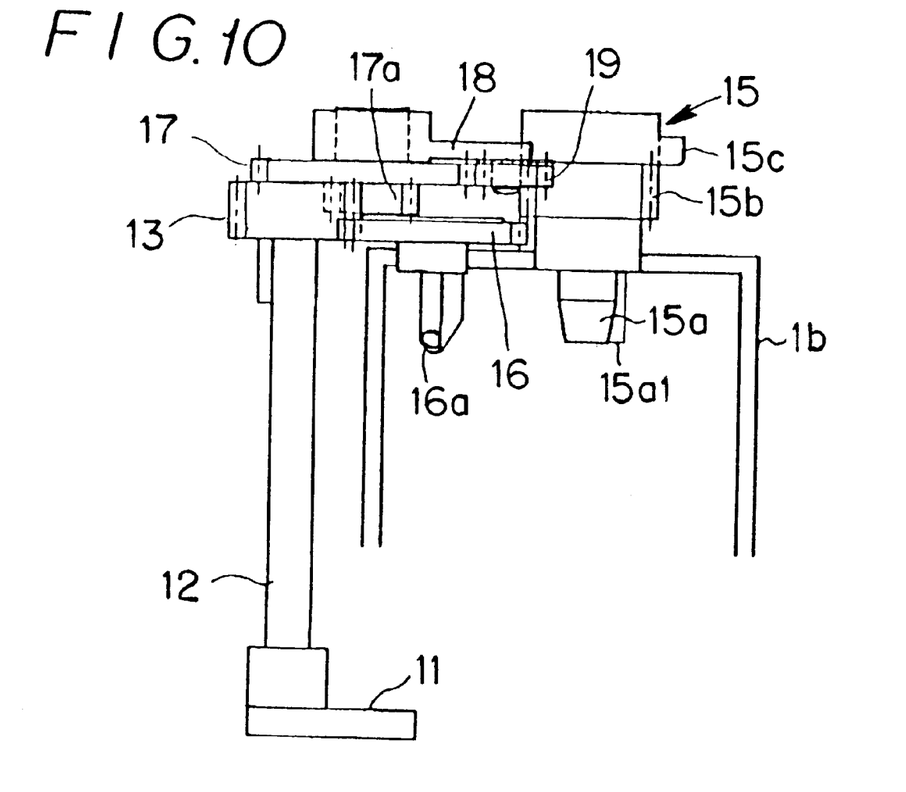
FIG. 10 is a front view of FIG. 9.

Referring now to FIGS. 9 and 10, a wheel train W2 for displaying the used or exposed state mark for the film as a photographed state during removal of the film cartridge C and for closing the shading cover in the film cartridge C is disposed on an upper surface of the housing portion 1b. The wheel train W2 comprises a rotating gear 15 for rotating the film shaft 24 of the film cartridge C, a drive gear 16, a drive shaft 16a for opening and closing the shading cover of the film cartridge C, a gear 17, and a clutch mechanism extending from the gear 17 to the rotating gear 15.

Figure 15:
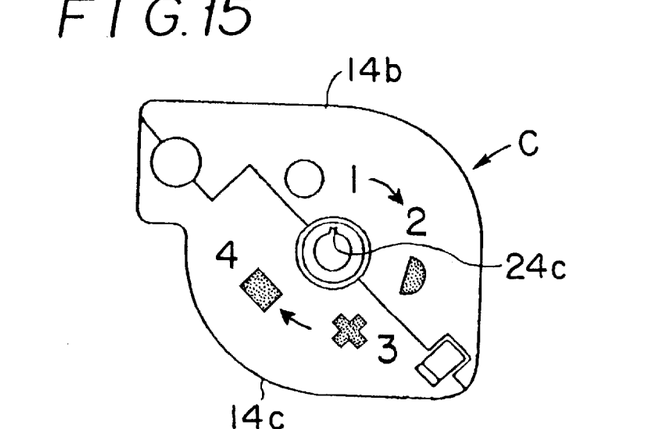
FIG. 15 is a bottom view of the film cartridge.

The rotating gear 15 has a shaft portion 15a having a small diameter and being disposed at a lower end of the rotating gear 15 for integral connection to the film shaft 24 of the film cartridge C, a tooth portion 15b formed at an intermediate portion thereof, and a projection 15c projecting outwardly from an upper portion thereof. The shaft portion 15a has a protrusion 15a1 for engagement with a groove portion 24c disposed in the film shaft 24 of the film cartridge C (FIG. 15).

The cover member 1c for opening and closing the housing portion 1b is disposed on a bottom surface of the camera case 1 (FIG. 12) and permits insertion and removal of the film cartridge C into or from the housing portion 1b. The operating lever 11 for locking the cover member is disposed adjacent to the cover member 1c. The operating lever 11 is integrally connected to the shaft 12 for undergoing pivotal movement. The shaft 12 extends to an upper surface of the housing portion 1b, and the gear 13 is fixed to an upper end portion of the shaft 12. The drive shaft 16a for opening and closing the shading cover of the film cartridge C is rotatably provided on the upper surface of the housing portion 1b. The drive gear 16 is integrally connected to an upper end portion of the drive shaft 16a and is in meshing engagement with the gear 13.

The gear 17 is rotatably supported by a shaft on an upper surface of the housing portion 1b. A pinion 17a is integrally connected to a lower surface of the gear 17 and is in meshing engagement with the gear 13. The clutch mechanism comprises a clutch lever 18 frictionally connected to an upper surface of the gear 17, a projection 18a disposed at a front end portion of the clutch lever 18 for engagement with the projection 15c of the rotating gear 15, and a clutch gear 19 rotatably provided on a lower surface of the front end portion of the clutch lever 18. The clutch gear 19 is always in meshing engagement with the gear 17, and can be meshed with the tooth portion 15b of the rotating gear 15 by pivoting the clutch lever 18. When the projection 15c of the rotating gear 15 is engaged with the projection 18a of the clutch lever 18, engagement between the clutch gear 19 and the tooth portion 15b is released. Furthermore, when the projection 15c and the projection 18a are engaged with each other and the clutch is released, a tongue piece 25a integrally connected to the film shaft 24 of the film cartridge C is set at a position shown by [3] in FIG. 15. Accordingly, when the clutch is released, the tongue piece 25a is set to a position indicating a photographed state.

A pin 17b projects from an upper surface of the gear 17 for engagement with the clutch lever 18. The pivoting range of the clutch mechanism is regulated by regulating means (not shown) and, for example, it is regulated to an extent of about 10 degrees of a center angle in a clockwise direction from the position shown in FIG. 9. Accordingly, the clutch lever 18 is pivotable only between the regulating means and the pin 17b.

Figure 13:
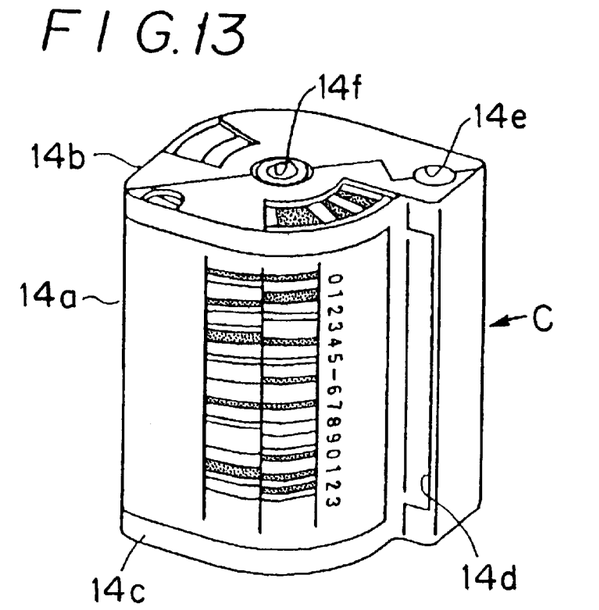
FIG. 13 is a perspective view showing the film cartridge.
Figure 14:
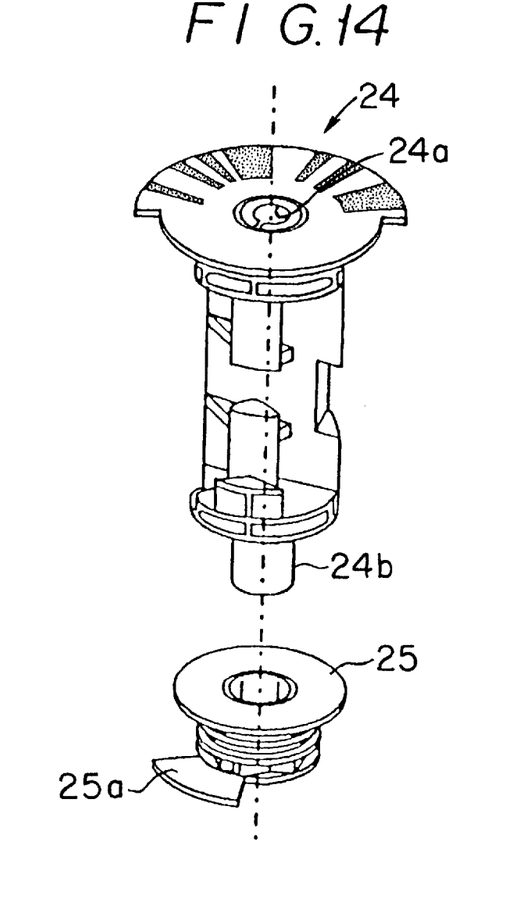
FIG. 14 is an exploded perspective view showing a structure of an inner portion of the film cartridge.

An example of a structure of the film cartridge C is shown in FIGS. 13 to 15. As shown in FIG. 15, the film cartridge C comprises a cartridge for an APS film and has a cartridge case 14a having a generally cylindrical shape, an upper cover 14b and a lower cover 14c. A slit 14d is provided in a part of the cartridge case 14a for drawing out the film, and a shading cover (not shown) is disposed within the slit 14d. The drive shaft 16a of the wheel train W2 is inserted through a through-hole 14e disposed between the upper cover 14b and the lower cover 14c for opening and closing the shading cover. A through-hole 14f is disposed in a center portion of the case 14a, and a shaft hole 24a of the film shaft 24 shown in FIG. 14 is disposed in the through-hole 14f. The shaft portion 15a of the rotating gear 15 is inserted into the shaft hole 24a for rotating the film shaft 24 to thereby perform the film winding and rewinding operations. A shaft portion 24b extends downwardly from a lower end portion of the film shaft 24, and a display member 25 is integrally connected to the shaft portion 24b. The display member 25 is adapted to display outside of the film cartridge C the used state of the film which is wound around the film shaft 24. The tongue piece 25a is integrally connected to the display member 25 so as to project outwardly therefrom.

As shown in FIG. 15, the film cartridge C is provided with marks for displaying the used state of the film by means of window holes [1] to [4] formed in the case 14a. The state shown in FIG. 15 is a state in which the tongue piece 25a exists at a position facing the window hole [1], and the window hole [1] is displayed to be white representing that the film has not been used. Since the tongue piece 25a is integrally connected to the film shaft 24, when the film is wound or rewound the film shaft 24 rotates and the tongue piece 25a is rotated as well, so that the tongue piece 25a is repeatedly moved to the positions facing the window holes [4], [3], [2], [1] . . . from the position facing the window hole [1].

FIG. 9 displays a state in which the shading cover of the film cartridge C is opened and the photographing operation is performed while winding the film within the film cartridge C. In this state, the clutch gear 19 of the clutch mechanism and the tooth portion 15b of the rotating gear 15 are not meshed with each other, and the rotating gear 15 can rotate freely so that the film can be wound and rewound by means of the knob 2.

When the operating lever 11 is pivoted clockwise from the position shown in FIG. 9, the gear 17 starts to rotate counterclockwise through the gear 13 and the pinion 17a, and the clutch lever 18 frictionally follows the rotation of the gear 17 in accordance with the motion of the pin 17b so that the projection 18a is brought into contact with an outer peripheral surface of the upper end portion of the rotating gear 15. At this time, the clutch gear 19 is meshed with the tooth portion 15b. This state is shown in FIG. 11(a).

Figure 11A:
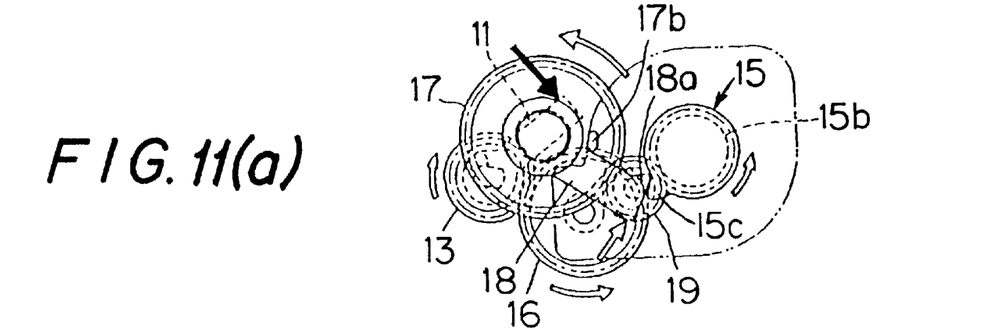
FIGS. 11(a) to 11(d) are plan views showing an operation when taking out a film cartridge in stages.
Figure 11B:
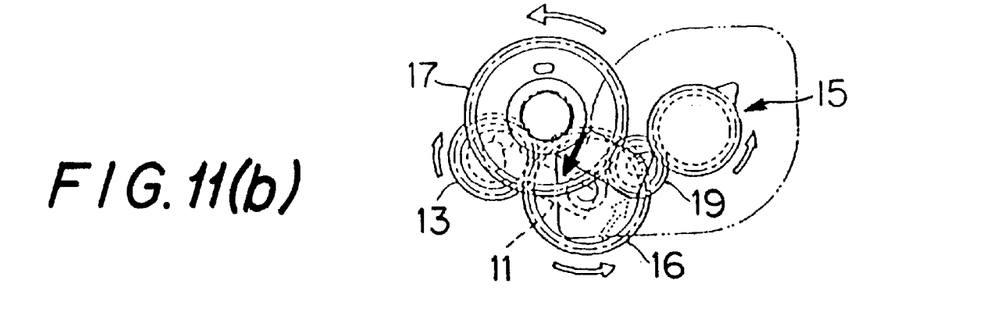

When the operating lever 11 is further pivoted clockwise from the position shown in FIG. 11(a), the rotating gear 15 rotates counterclockwise by counterclockwise rotation of the gear 17 interlocking with clockwise rotation of the gear 13 and clockwise rotation of the clutch gear 19, so that the film shaft 24 of the film cartridge C rotates in a film rewinding direction. Further, at the same time, the drive gear 16 also rotates counterclockwise so as to rotate the drive shaft 16a of the shading cover to thereby start closing the shading cover. This state is shown in FIG. 11(b).

Figure 11C:
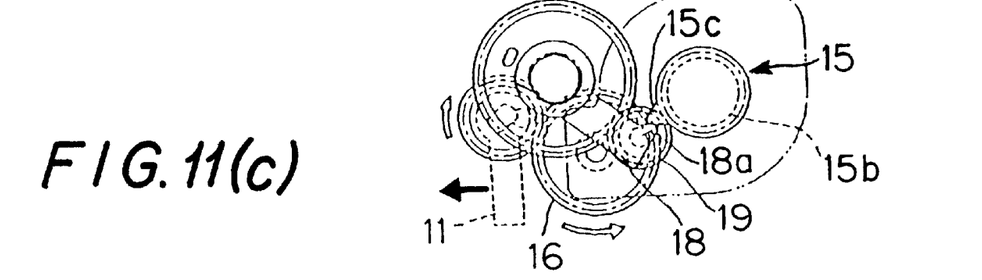
Figure 11D:
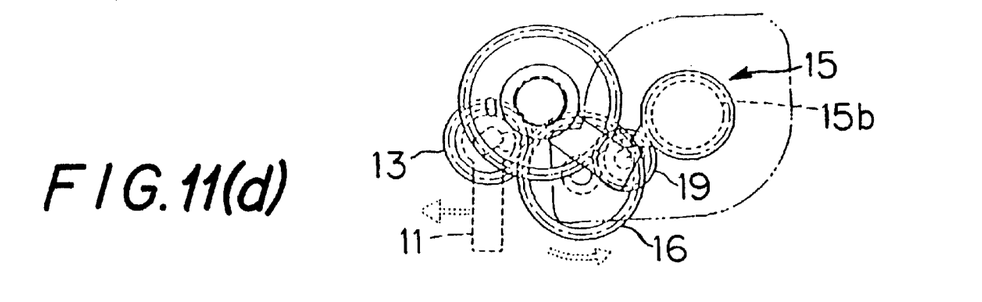

When the operating lever 11 is further pivoted clockwise to continue to rotate the rotating gear 15, the projection 15c of the rotating gear 15 is engaged with the projection 18a of the clutch lever 18 so as to pivot the lever 18 clockwise as shown in FIG. 11(c), thereby releasing the engagement between the clutch gear 19 and the tooth portion 15b, so that rotation is not transmitted to the rotating gear 15. However, the drive gear 16 continues to rotate to close the shading cover, and the shading cover is completely closed when it reaches the state shown in FIG. 11(d). Thereafter, the film cartridge C may be removed from the camera by opening the cover member 1c shown in FIG. 12.

By the foregoing construction and operation of the camera according to the present invention, the tongue piece 25a automatically faces the window hole representing the photographed or used state of the film only by pivoting the operating lever 11. Thus, the used state of the film is effectively displayed and can be readily recognized by the user and the film cartridge C can be removed from the camera without error.

Figure 16A:
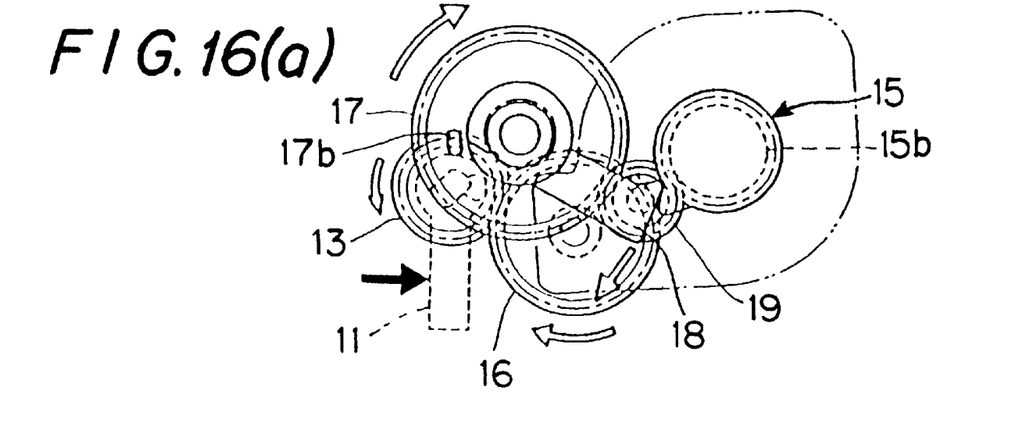
FIGS. 16(a) and 16(b) are plan views showing an operation of loading a film in stages.
Figure 16B:
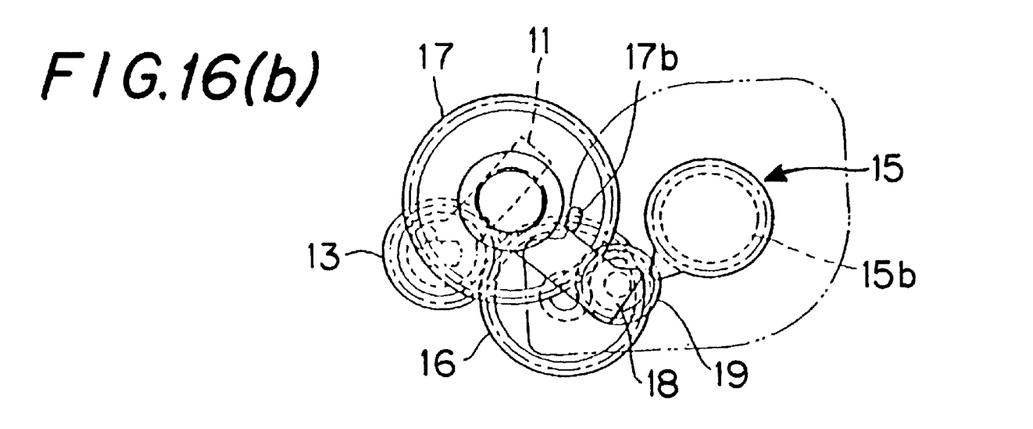

FIGS. 16(a) and 16(b) show an operation for loading a new film cartridge C into the camera. When the cartridge C is inserted into the housing portion 1b and the operating lever 11 is pivoted counterclockwise from the position shown in FIG. 16(a) in order to lock the cover member 1c, the gear 17 starts to rotate clockwise through the gear 13 and the pinion 17a, and the clutch lever 18 frictionally follows rotation of the gear 17 so as to pivot clockwise, thereby releasing engagement between the tooth portion 15b of the rotation gear 15 and the clutch gear 19. In this state, the drive gear 16 rotates clockwise interlocking with rotation of the gear 13 so as to rotate the drive shaft 16a of the shading cover and the state shown in FIG. 16(b) is achieved in which the shading cover is completely opened. At this time, since clockwise rotation of the clutch lever 18 is regulated within a certain angle by the regulating means (not shown), the clutch lever 18 does not rotate clockwise endlessly in accordance with rotation of the gear 17. Further, since counterclockwise rotation is also regulated by the pin 17a of the gear 17, the gear 15 and the clutch gear 19 are not engaged with each other even when the clutch lever 18 is pivoted by an external force. This state becomes the state shown in FIG. 1 in which the film can be wound. Accordingly, when a rotation is transmitted to the rotating gear 15 by operating the winding knob 2, the film is wound smoothly around the winding shaft 3 so that the photographing operation is made possible.

Figure 12:
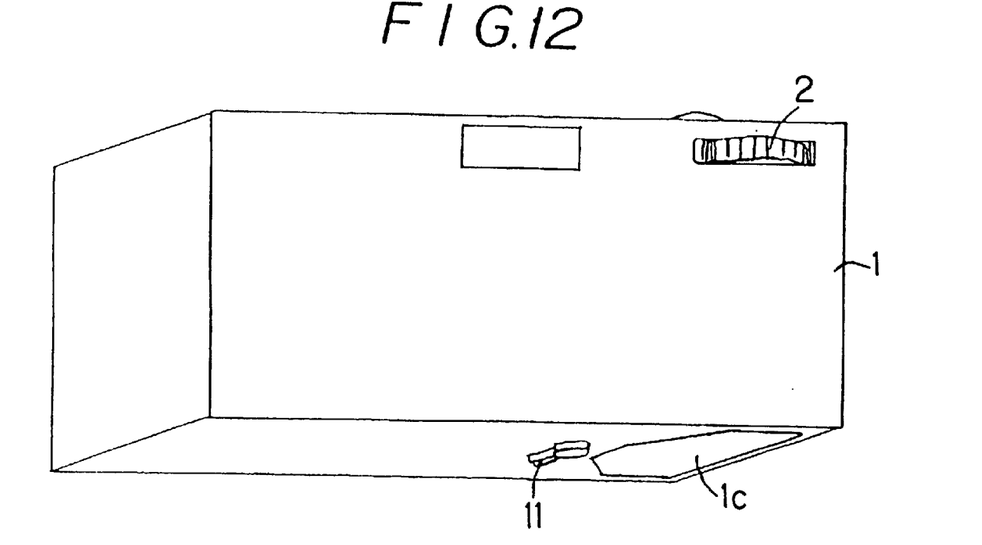
FIG. 12 is a perspective view showing a bottom portion of a camera according to the present invention.

When the winding knob 2 is rotated in a rightward direction in FIG. 12, the rotating gear 15 rotates clockwise in FIG. 16(b) so as to allow winding of the film. Furthermore, the rotation of the winding knob 2 is transmitted to the winding shaft 3 through the transmitting wheel train so that the film can be wound. Further, during a rewinding operation, the clutch means 23 shown in FIG. 3 is released so as to place the winding shaft 3 in a freewheeling state. When the winding knob 2 is rotated in a leftward direction in FIG. 12, the rotating gear 15 is rotated counterclockwise in FIG. 16(b) through the transmitting wheel train in an interlocking manner so that the film can be rewound.

The normal state of the camera shown in FIG. 1 corresponds to a state in which the winding button 5 is in a non-operated state, the reverse rotation preventing lever 4 is disposed at the first position and photographing is performed by winding the film F one frame at a time. The operation of the camera at this point will be briefly mentioned below. When the winding knob 2 is rotated counterclockwise and the gear 21 of the film shaft 24 and the winding shaft 3 are rotated clockwise so as to advance the film leftward in FIG. 1, the sprocket wheel 10a having the sprocket teeth 10a1 fitted into the perforations of the film rotates clockwise, and the shutter lever 8 is pivoted counterclockwise through the cam 10b and the arm 8e, so that the spring 9 is wound and a spring force is charged. When the shutter lever 8 is pivoted counterclockwise, the engaging projection 8c is gradually released from the projecting portion 6e. At the moment the engaging projection 8c is released, the release lever 6 is pivoted counterclockwise due to the spring force of the spring 7, but the projecting piece 6f is brought into contact with the cam surface of the cam 10c, so that the position of the release lever 6 is maintained. At this time, the engaging pawl 6g is not meshed with the gear 3a yet. When the shutter lever 8 further rotates in accordance with advancement of the film, the projecting piece 6f drops in the gap of the cam 10c due to the spring force of the spring 7, so that the engaging pawl 6g is meshed with the gear 3a, thereby preventing the winding shaft 3 from rotating. This position corresponds to a position in which the film is wound by only one frame, and at this position since a right end surface of the engaging projection 8c is engaged with a left end surface of the projecting portion 6e, the position of the shutter lever 8 is kept in that position against an urging force of the spring 9.

Next, when the release button is pressed, the arm 6a descends and the release lever 6 is pivoted clockwise, the projecting portion 6e moves upward and engagement with the engaging projection 8c at the end surface is released, so that the shutter lever 8 becomes free and is instantaneously returned to the original position shown in FIG. 1 due to the spring force charged in the spring 9. At this time, by operating a shutter operating portion (not shown) the shutter drive portion 8b operates the shutter and the photographing operation is performed. By repeating this motion, the winding of the film and the photographing operation are repeated.

Figure 4:
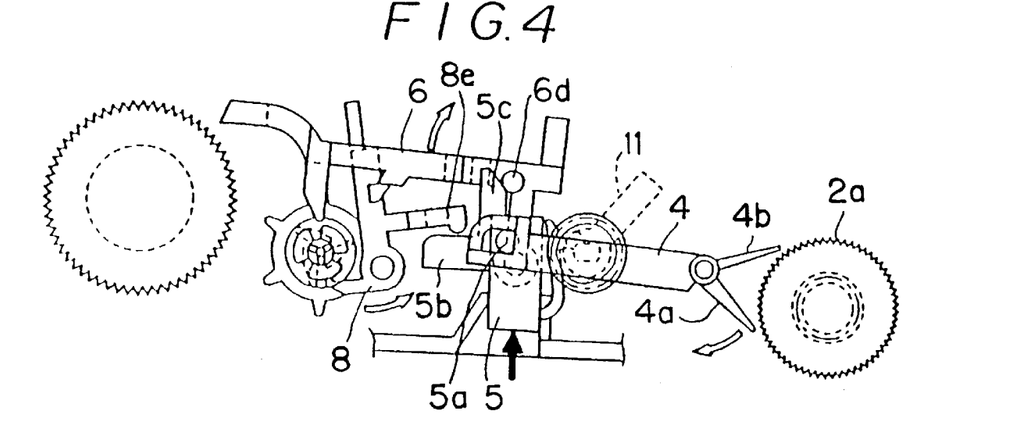
FIG. 4 is a plan view showing a state in which a rewinding button for rewinding a film is slightly pressed.
Figure 5:
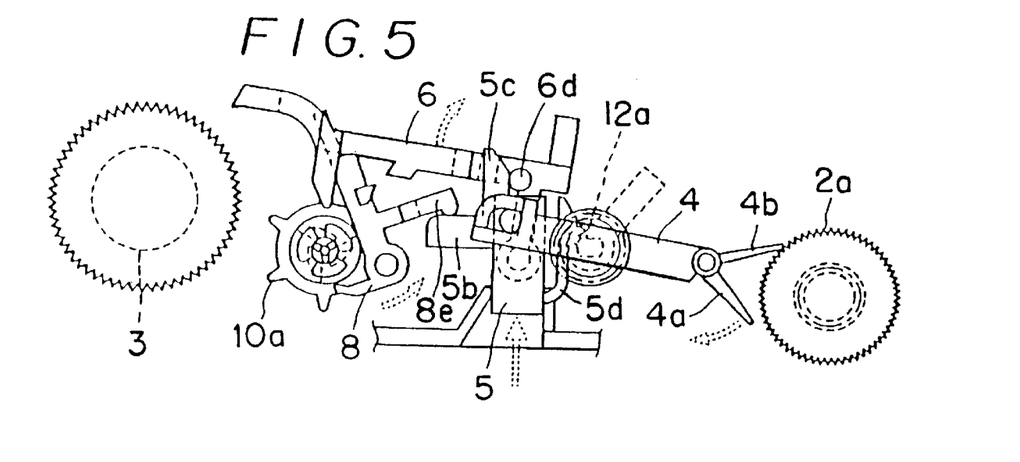
FIG. 5 is a plan view showing an operating state in which the rewinding button is completely pressed from the state shown in FIG. 4.

When the photographing operation is finished and the film is rewound, as shown in FIG. 4, the rewinding button 5 is pressed and moved upward. Accordingly, the connecting pin 5a and the arms 5b and 5c move upward, thereby pivoting the reverse rotation preventing lever 4 clockwise, releasing the reverse rotation preventing pawl 4a from the tooth portion 2a of the winding knob 2, pivoting the shutter lever 8 counterclockwise through the arm 8d, and shunting the arm 5e from the cam 10b. Furthermore, the pin 6b is pushed upward, thereby pivoting the release lever 6 clockwise. The state shown in FIG. 5 corresponds to a state in which the rewinding button 5 is sufficiently moved upward and is in an operating state and the reverse rotation preventing lever 4 is disposed at the second position. In this state, the reverse rotation preventing pawl 4a is released from the tooth portion 2a of the winding knob 2, the reverse rotation preventing pawl 4b is meshed with the tooth portion 2a and the winding knob 2 can rotate only in a reverse rotating direction (clockwise). Further, a front end of the elastically engaging arm 5d of the rewinding button 5 is engaged with the engaging portion 12a, so that an operating state of the rewinding button 5 can be maintained. In this state, the release lever 6 is maintained at a position of being pivoted clockwise due to the fact that a movement of the pin 6d is prevented by the arm 5c, the shutter lever 8 is maintained at a position of being pivoted counterclockwise due to the fact that a movement of the arm 8d is prevented by the arm 5b, and the pin wheel 10a and the winding shaft 3 are placed in a freewheeling state.

Figure 6:
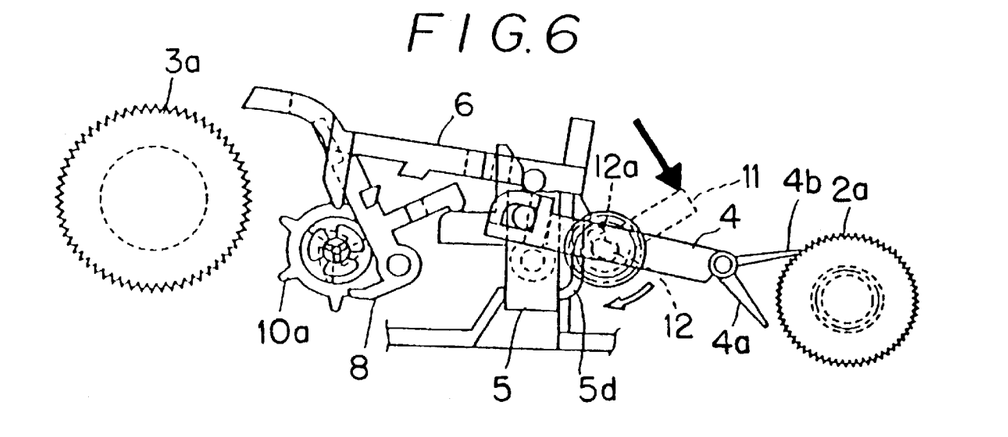
FIG. 6 is a plan view showing a state in which an operating lever is slightly pivoted in order to return the rewinding button.
Figure 7:
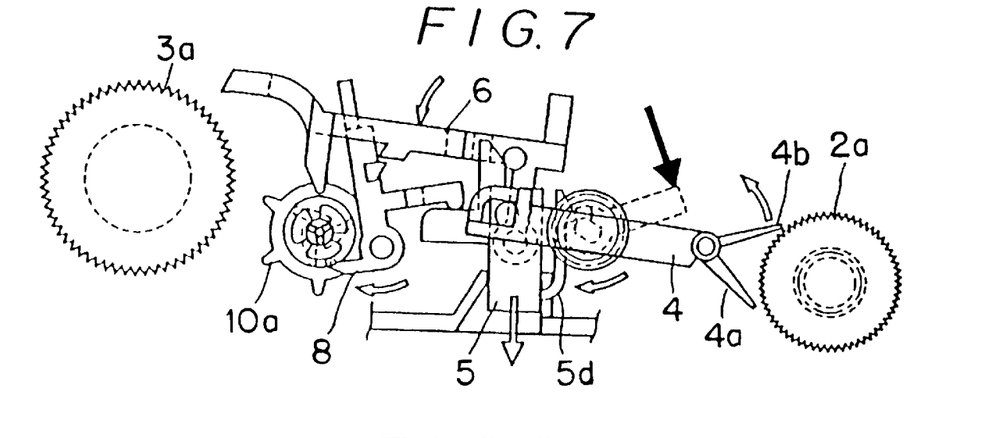
FIG. 7 is a plan view showing a state in which the operating lever is further pivoted from the state shown in FIG. 6.
Figure 8:
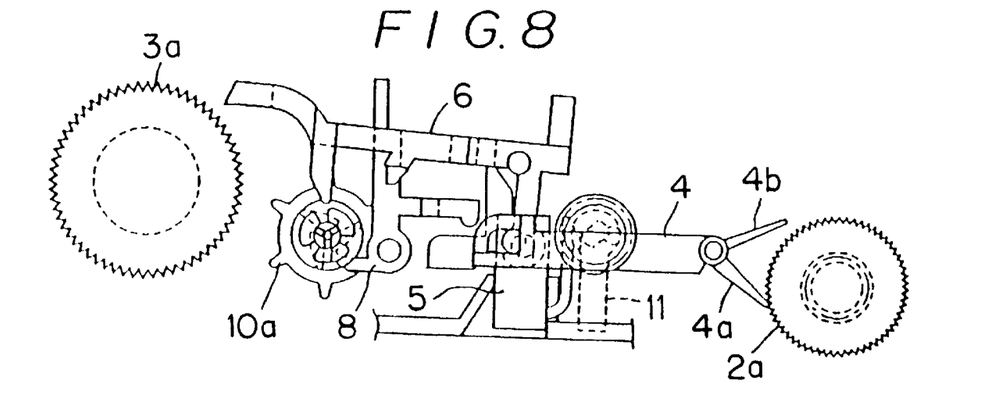
FIG. 8 is a plan view showing a state in which the operating lever is completely pivoted and the rewinding button is returned to a non-operating state.

Thus, when the winding knob 2 is rotated clockwise in such a manner as described above, the film F can be rewound within the film cartridge C. When the rewinding operation is completed, the rewinding button 5 is returned to a non-operating state. This returning operation is simultaneously performed when removing the rewound film cartridge C. That is, as shown in FIG. 6, in order to remove the film cartridge C, when the operating lever 11 is pivoted clockwise to release a lock of the cover member in the cartridge housing portion, the engaging portion 12a is released from the engaging position of the elastically engaging arm 5d due to rotation of the shaft 12, so that the mechanism for maintaining the operating state of the rewinding button 5 is released. Accordingly, a clockwise spring force due to the spring 9 of the shutter lever 8 and a counterclockwise spring force due to the spring 7 of the release lever 6 act together and apply a descending force to the rewinding button 5. As a result of the descending force applied to the rewinding button 5, the reverse rotation preventing lever 4 is pivoted counterclockwise, the reverse rotation preventing pawl 4b is released (FIG. 7) from the tooth portion 2a of the winding knob 2, the reverse rotation preventing pawl 4a is meshed (FIG. 8) with the tooth portion 2a and the winding knob 2 can be rotated in a winding direction (counterclockwise). The state shown in FIG. 8 corresponds to a position in which the operating lever 11 is pivoted clockwise by about 140 degrees. Further, during this pivoting motion, the shading cover of the film cartridge is simultaneously closed and the used state mark displays a photographed state of the film. In other words, the gear 17 starts to rotate counterclockwise through the gear 13 and the pinion 17a, the clutch lever 18 frictionally follows a rotation of the gear 17 in accordance with a movement of the pin 17b, and the projection 18a is brought into contact with an outer peripheral surface of the upper end portion of the rotating gear 15 and becomes a state of being elastically pressed. At this time, the clutch gear 19 is meshed with the tooth portion 15b. This state is shown in FIG. 11(a).

When the operating lever 11 is further pivoted clockwise from the position shown in FIG. 11(a), the rotating gear 15 rotates counterclockwise by counterclockwise rotation of the gear 17 interlocking with clockwise rotation of the gear 13 and clockwise rotation of the clutch gear 19, so that the shaft of the film is rotated in a film rewinding direction. Further, at the same time, the drive gear 16 also rotates counterclockwise so as to rotate the drive shaft 16a of the shading cover to start closing the shading cover. This state is shown in FIG. 11(b).

When clockwise pivoting motion of the operating lever 11 is continued and the rotating gear 15 rotates, the projection 15c of the rotating gear 15 is engaged with the projection 18a of the clutch lever 18 so as to pivot the lever 18 clockwise as shown in FIG. 11(c), thereby releasing engagement between the clutch gear 19 and the tooth portion 15b so that rotation is not transmitted to rotating gear 15. However, the drive gear 16 continues to rotate and close the shading cover. The shading cover is completely closed when it reaches the state shown in FIG. 11(d). The film cartridge C may be removed by opening the cover member 1c shown in FIG. 12. By this construction and operation, as described above, the tongue piece 25a automatically faces the window hole representing the photographed or used state of the film only by pivoting the operating lever 11. Thus, the used state of the film is effectively displayed and can be readily recognized by the user and the film cartridge C can be removed from the camera without error.

By providing a mechanism having a rotating direction regulating member which is selectively disposed at the first and second positions as described above, the winding and rewinding of the film can be performed only by switching a rotating direction of one winding knob, thereby simplifying the winding and rewinding operations and the overall structure of the camera.

Since a mechanism for maintaining the operating state is provided in the regulating member drive portion and an operating lever for locking the cover member of the film cartridge housing portion is used for placing the mechanism in a non-operating state, an exposure can be performed in the non-operating state and a rewinding operation can be performed in the operating state. By this construction, the exposure is not performed during the rewinding operation, thereby preventing a double-exposure.

Moreover, since the opening and closing of the shading cover and the switching of the display of the used state of the film are performed by the wheel train when performing a manual lock releasing operation for the cover member or a manual locking operation which are performed during removal or loading of the film, an economical camera in which APS film is used can be achieved.

I claim:

1. A camera comprising: an operating member mounted for rotation in first and second opposite directions by manual operation for winding and rewinding a film, respectively; a rotational winding member mounted for connection to and disconnection from the operating member; and a control member mounted for movement between first and second positions for controlling the rotating direction of the operating member; wherein when the control member is disposed in the first position, the operating member can be rotated only in the first direction and the rotational winding member is connected to the operating member for rotation therewith to wind the film, and when the control member is disposed in the second position, the operating member can be rotated only in the second direction to rewind the film while the rotational winding member is disconnected from and does not rotate with the operating member.

2. A camera as claimed in claim 1; further comprising a drive member for driving the control member to the first and second positions.

3. A camera as claimed in claim 1; further comprising a film cartridge chamber for accommodating a film cartridge containing the film, the film cartridge chamber having an opening through which the film cartridge is inserted into the film cartridge chamber and taken out therefrom; a cover member mounted for movement to open and close the opening of the film cartridge chamber; an operating lever mounted for pivotal movement for moving the cover member to the open and closed positions; a drive member operable in a non-operating state by the operating lever engaging with the drive member for driving the control member to the first position, and an operating state where the operating lever does not engage the drive member for driving the control member to the second position; and a mechanism disposed between the drive member and the operating lever for maintaining the operating state of the drive member; wherein the drive member is switched from the operating state to the non-operating state by pivotal movement of the operating lever.

4. A camera as claimed in claim 1; further comprising a film cartridge chamber for accommodating a film cartridge containing the film, the film cartridge having a rotational shaft, a shading cover and a mark for displaying an exposed state of the film; a rotational gear for rotating the rotational shaft of the film cartridge; a drive gear for opening and closing the shading cover of the film cartridge; an operating lever mounted for pivotal movement; and a transmitting wheel train having a clutch mechanism for transmitting a pivotal movement of the operating lever to the rotational gear and the drive gear; wherein when the film cartridge is removed from the film cartridge chamber, the clutch mechanism of the tranmitting wheel train is engaged by pivoting the operating lever in a first direction to thereby rotate the rotating gear to cause the mark of the film cartridge to display an exposed state of the film and to thereby rotate the drive gear to close the shading cover, and when the film cartridge is inserted into the film cartridge chamber, the clutch mechanism of the transmitting wheel train is disengaged by pivoting the operating lever in a second direction opposite to the first direction so that a rotational drive is not transferred to the rotating gear while the drive gear is rotated to open the shading cover.

5. A camera as claimed in claim 4; further comprising a drive member operable in a non-operating state by the operating lever engaging with the drive member for driving the control member to the first position, and an operating state where the operating lever does not engage the drive member for driving the control member to the second position.

6. A camera as claimed in claim 5; further comprising a mechanism disposed between the drive member and the operating lever for maintaining the operating state of the drive member; wherein the drive member is switched from the operating state to the non-operating state by pivotal movement of the operating lever.

7. A camera as claimed in claim 6; wherein the film cartridge chamber has an opening through which the film cartridge is inserted into the film cartridge chamber and taken out therefrom; and further comprising a cover member integrally connected to the operating lever for opening and closing the opening of the film cartridge chamber by pivotal movement of the operating lever.

8. A camera comprising: a film cartridge chamber for accommodating a film cartridge containing film, the film cartridge having a rotational shaft, a shading cover and a mark for displaying an exposed state of the film; a rotational gear for rotating the rotational shaft of the film cartridge; a drive gear for opening and closing the shading cover of the film cartridge; an operating lever mounted for pivotal movement; and a transmitting wheel train having a clutch mechanism for transmitting pivotal movement of the operating lever to the rotational gear and the drive gear; wherein when the film cartridge is removed from the film cartridge chamber, the clutch mechanism of the tranmitting wheel train is engaged by pivoting the operating lever in a first direction to thereby rotate the rotating gear to cause the mark of the film cartridge to display an exposed state of the film and to thereby rotate the drive gear to close the shading cover, and when the film cartridge is inserted into the film cartridge chamber, the clutch mechanism of the transmitting wheel train is disengaged by pivoting the operating lever in a second direction opposite to the first direction so that a rotational drive is not transferred to the rotating gear while the drive gear is rotated to open the shading cover.

9. A camera as claimed in claim 8; wherein the film cartridge chamber has an opening through which the film cartridge is inserted into the film cartridge chamber and taken out therefrom; and further comprising a cover member integrally connected to the operating lever for opening and closing the opening of the film cartridge chamber by pivotal movement of the operating lever.

10. A camera for use with a film cartridge having a rotational film shaft and a mark for indicating whether a film in the film cartridge is exposed or unexposed, the camera comprising:

a main body;
   a film cartridge chamber disposed in the main body for accommodating the film cartridge, the film cartridge chamber having an opening through which the film cartridge is inserted into the film cartridge chamber and taken out therefrom;

a driving mechanism for rotationally driving the rotational film shaft of the film cartridge to wind and rewind the film;

an operating member for operating the driving mechanism by manual operation, the rotational operating member being mounted for rotation in first and second opposite directions for winding and rewinding the film, respectively;

a rotational winding member mounted for connection to and disconnection from the operating member by operation of the driving mechanism; and a control member mounted for movement between first and second positions for controlling the rotating direction of the operating member;

wherein when the control member is disposed in the first position, the operating member can be rotated only in the first direction and the rotational winding member is connected to the operating member for rotation therewith to wind the film, and when the control member is disposed in the second position, the operating member can be rotated only in the second direction to rewind the film while the rotational winding member is disconnected from and does not rotate with the operating member.

11. A camera as claimed in claim 10; further comprising a cover member disposed on the main body for opening and closing the opening of the film cartridge chamber; and an operating lever for unlocking and locking the cover member to permit the cover member to opened and closed.

12. A camera as claimed in claim 11; wherein the film cartridge has a shading cover for covering the film; and wherein the driving mechanism comprises a rotational gear for rotating the rotational film shaft of the film cartridge, a drive gear for opening and closing the shading cover of the film cartridge, and a transmitting wheel train having a clutch mechanism for transmitting a pivotal movement of the operating lever to the rotational gear and the drive gear; wherein when the film cartridge is removed from the film cartridge chamber, the clutch mechanism of the tranmitting wheel train is engaged by pivoting the operating lever in a first direction to thereby rotate the rotating gear to cause the mark of the film cartridge to display an exposed state of the film and to thereby rotate the drive gear to close the shading cover, and when the film cartridge is inserted into the film cartridge chamber, the clutch mechanism of the transmitting wheel train is disengaged by pivoting the operating lever in a second direction opposite to the first direction so that a rotational drive is not transferred to the rotating gear while the drive gear is rotated to open the shading cover.

13. A camera as claimed in claim 11; further comprising a drive member operable in a non-operating state by the operating lever engaging with the drive member for driving the control member to the first position, and an operating state where the operating lever does not engage the drive member for driving the control member to the second position.

14. A camera as claimed in claim 13; further comprising a mechanism disposed between the drive member and the operating lever for maintaining the operating state of the drive member; wherein the drive member is switched from the operating state to the non-operating state by pivotal movement of the operating lever.

15. A camera comprising: an operating member mounted for rotation in first and second opposite directions by manual operation for winding and rewinding a film, respectively; a control member mounted for movement between first and second positions for controlling the rotating direction of the operating member; a film cartridge chamber for accommodating a film cartridge containing the film, the film cartridge chamber having an opening through which the film cartridge is inserted into the film cartridge chamber and taken out therefrom; a cover member mounted for movement to open and close the opening of the film cartridge chamber; an operating lever mounted for pivotal movement for moving the cover member to the open and closed positions; a drive member operable in a non-operating state by the operating lever engaging with the drive member for driving the control member to the first position, and an operating state where the operating lever does not engage the drive member for driving the control member to the second position, the drive member being switched from the operating state to the non-operating state by pivotal movement of the operating lever; and a mechanism disposed between the drive member and the operating lever for maintaining the operating state of the drive member.

16. A camera comprising: an operating member mounted for rotation in first and second opposite directions by manual operation for winding and rewinding a film, respectively; a control member mounted for movement between first and second positions for controlling the rotating direction of the operating member; a film cartridge chamber for accommodating a film cartridge containing the film, the film cartridge having a rotational shaft, a shading cover and a mark for displaying an exposed state of the film; a rotational gear for rotating the rotational shaft of the film cartridge; a drive gear for opening and closing the shading cover of the film cartridge; an operating lever mounted for pivotal movement; and a transmitting wheel train having a clutch mechanism for transmitting a pivotal movement of the operating lever to the rotational gear and the drive gear; wherein when the film cartridge is removed from the film cartridge chamber, the clutch mechanism of the transmitting wheel train is engaged by pivoting the operating lever in a first direction to thereby rotate the rotational gear to cause the mark of the film cartridge to display an exposed state of the film and to thereby rotate the drive gear to close the shading cover, and when the film cartridge is inserted into the film cartridge chamber, the clutch mechanism of the transmitting wheel train is disengaged by pivoting the operating lever in a second direction opposite to the first direction so that a rotational drive is not transferred to the rotating gear while the drive gear is rotated to open the shading cover.

17. A camera as claimed in claim 16; further comprising a drive member operable in a non-operating state by the operating lever engaging with the drive member for driving the control member to the first position, and an operating state where the operating lever does not engage the drive member for driving the control member to the second position.

18. A camera as claimed in claim 17; further comprising a mechanism disposed between the drive member and the operating lever for maintaining the operating state of the drive member; wherein the drive member is switched from the operating state to the non-operating state by pivotal movement of the operating lever.

19. A camera as claimed in claim 18; wherein the film cartridge chamber has an opening through which the film cartridge is inserted into the film cartridge chamber and taken out therefrom; and further comprising a cover member integrally connected to the operating lever for opening and closing the opening of the film cartridge chamber by pivotal movement of the operating lever.

20. A camera for use with a film cartridge having a rotational film shaft and a mark for indicating whether a film in the film cartridge is exposed or unexposed, the camera comprising: a main body; a film cartridge chamber disposed in the main body for accommodating the film cartridge, the film cartridge chamber having an opening through which the film cartridge is inserted into the film cartridge chamber and taken out therefrom; a driving mechanism for rotationally driving the rotational film shaft of the film cartridge to wind and rewind the film; an operating member for operating the driving mechanism by manual operation, the operating member being mounted for rotation in first and second opposite directions for winding and rewinding the film, respectively; a rotational winding member mounted for connection to and disconnection from the operating member by operation of the driving mechanism; and a control member mounted for movement between first and second positions for controlling the rotating direction of the operating member.

21. A camera as claimed in claim 20; further comprising a cover member disposed on the main body for opening and closing the film cartridge chamber; and an operating lever for unlocking and locking the cover member to open and close, respectively, the opening of the film cartridge chamber.

22. A camera as claimed in claim 21; wherein the film cartridge has a shading cover for covering the film; and wherein the driving mechanism comprises a rotational gear for rotating the rotational film shaft of the film cartridge, a drive gear for opening and closing the shading cover of the film cartridge, and a transmitting wheel train having a clutch mechanism for transmitting a pivotal movement of the operating lever to the rotational gear and the drive gear; wherein when the film cartridge is removed from the film cartridge chamber, the clutch mechanism of the transmitting wheel train is engaged by pivoting the operating lever in a first direction to thereby rotate the rotating gear to cause the mark of the film cartridge to display an exposed state of the film and to thereby rotate the drive gear to close the shading cover, and when the film cartridge is inserted into the film cartridge chamber, the clutch mechanism of the transmitting wheel train is disengaged by pivoting the operating lever in a second direction opposite to the first direction so that a rotational drive is not transferred to the rotating gear while the drive gear is rotated to open the shading cover.

23. A camera as claimed in claim 21; further comprising a drive member operable in a non-operating state by the operating lever engaging with the drive member for driving the control member to the first position, and an operating state where the operating lever does not engage the drive member for driving the control member to the second position.

24. A camera as claimed in claim 23; further comprising a mechanism disposed between the drive member and the operating lever for maintaining the operating state of the drive member; wherein the drive member is switched from the operating state to the non-operating state by pivotal movement of the operating lever.

* * * * *